US011070646B1

(12) United States Patent
Lingafelt et al.

(10) Patent No.: US 11,070,646 B1
(45) Date of Patent: Jul. 20, 2021

(54) METHODS AND SYSTEMS FOR SELECTION OF REMOTE SERVICES

(71) Applicant: INTERNATIONAL BUSINESS MACHINES CORPORATION, Armonk, NY (US)

(72) Inventors: Charles Steven Lingafelt, Durham, NC (US); John E. Moore, Jr., Pflugerville, TX (US); Andrew R. Jones, Round Rock, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/748,515

(22) Filed: Jan. 21, 2020

(51) Int. Cl.
*H04L 29/08* (2006.01)

(52) U.S. Cl.
CPC ........ *H04L 67/327* (2013.01); *H04L 67/1008* (2013.01); *H04L 67/16* (2013.01); *H04L 67/20* (2013.01)

(58) Field of Classification Search
CPC ......... H04L 67/00; H04L 67/02; H04L 67/06; H04L 67/10; H04L 67/1002; H04L 67/1004; H04L 67/1008–1014; H04L 67/1023; H04L 67/1029; H04L 67/14; H04L 67/141; H04L 67/16; H04L 67/20; H04L 67/32; H04L 67/322; H04L 67/327
See application file for complete search history.

(56) References Cited

U.S. PATENT DOCUMENTS

| | | | | |
|---|---|---|---|---|
| 6,260,070 | B1* | 7/2001 | Shah | H04L 29/06 709/220 |
| 6,748,439 | B1* | 6/2004 | Monachello | H04L 12/5692 340/1.1 |
| 6,795,860 | B1* | 9/2004 | Shah | H04L 29/12066 709/229 |
| 8,548,863 | B2 | 10/2013 | Diwakar | |
| 9,467,970 | B1* | 10/2016 | Kim | H04L 67/1008 |
| 10,133,608 | B2 | 11/2018 | Sapuram et al. | |
| 10,230,571 | B2 | 3/2019 | Rangasamy et al. | |
| 10,511,675 | B1* | 12/2019 | Chud | H04L 67/101 |
| 10,536,536 | B1* | 1/2020 | Simon | H04L 67/16 |
| 2001/0037476 | A1* | 11/2001 | Yamamoto | H04L 67/16 714/37 |

(Continued)

FOREIGN PATENT DOCUMENTS

WO 2018144060 A1 8/2018

OTHER PUBLICATIONS

Disclosed anonymously (Sep. 2009). "Method and System for an Opportunistic Model for Cloud Work Load Processing". IPCOM000188291D. (3 Pages).

(Continued)

*Primary Examiner* — Boris D Grijalva Lobos
(74) *Attorney, Agent, or Firm* — Griffiths & Seaton PLLC

(57) ABSTRACT

Embodiments for selecting a remote service for a core program are provided. A request for a remote service is received. Information associated with each of a plurality of remote services is received from at least one information source. A score for each of the plurality of remote services is calculated based on the information associated with each of the plurality of remote services and at least one remote service evaluation criteria.

18 Claims, 5 Drawing Sheets

(56) References Cited

U.S. PATENT DOCUMENTS

| | | | |
|---|---|---|---|
| 2003/0009545 A1* | 1/2003 | Sahai | H04L 29/06 709/223 |
| 2003/0233602 A1* | 12/2003 | Lindquist | G06F 9/5055 714/47.1 |
| 2004/0122962 A1* | 6/2004 | DiFalco | H04L 29/06 709/229 |
| 2007/0226774 A1* | 9/2007 | Pardo-Blazquez | H04L 29/06 726/1 |
| 2010/0017828 A1* | 1/2010 | Xiong | H04L 65/4084 725/93 |
| 2010/0017853 A1* | 1/2010 | Readshaw | H04L 63/12 726/3 |
| 2011/0093564 A1* | 4/2011 | Li | H04L 12/6418 709/217 |
| 2016/0330138 A1 | 11/2016 | Thomason | |
| 2017/0366497 A1* | 12/2017 | Feng | H04M 15/74 |
| 2019/0173940 A1 | 6/2019 | Bagarolo et al. | |
| 2019/0253485 A1* | 8/2019 | Jyoti Banerjee | H04L 67/1097 |

OTHER PUBLICATIONS

Clark, K., Warnier, M., & Brazier, F. M. (2012). "An intelligent cloud resource allocation service". In Proceedings of the 2nd international conference on cloud computing and services science (Closer 2012). (9 Pages).

* cited by examiner

US 11,070,646 B1

METHODS AND SYSTEMS FOR SELECTION OF REMOTE SERVICES

BACKGROUND OF THE INVENTION

Field of the Invention

The present invention relates in general to computing systems, and more particularly, to various embodiments for selection of remote services.

Description of the Related Art

Generally, distributing computing (or distributed computing systems) refers to computing systems (e.g., cloud systems, "edge" systems, etc.) and/or programs that utilize multiple components (e.g., remote services, nodes, containers, etc.) that are implemented on different networked computing devices that coordinate their actions by sending various types of communications (e.g., requests, data, etc.) to one another. Often, this activity is performed in order to achieve a common goal (i.e., the components are working together to jointly perform a functionality or task). For example, the components (e.g., a core program and remote services, such as microservices) may jointly run a distributed program. The implementation of such systems is becoming increasingly common as many organizations (e.g., companies, service providers, etc.) are transitioning from monolithic applications towards utilizing, for example, multiple microservices and packaged containers.

In some instances, over time, multiple providers are able to provide the same remote service (e.g., microservice). In such cases, the core program (and/or a human responder) may require a method to select the appropriate (and/or the "best") provider. As such, a remote services selection engine (and/or method) may become a fundamental control point of remote services, in the same way search engines have become such for the Internet in general.

SUMMARY OF THE INVENTION

Various embodiments for selecting a remote service for a core program, by a processor, are provided. A request for a remote service is received. Information associated with each of a plurality of remote services is received from at least one information source. A score for each of the plurality of remote services is calculated based on the information associated with each of the plurality of remote services and at least one remote service evaluation criteria.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
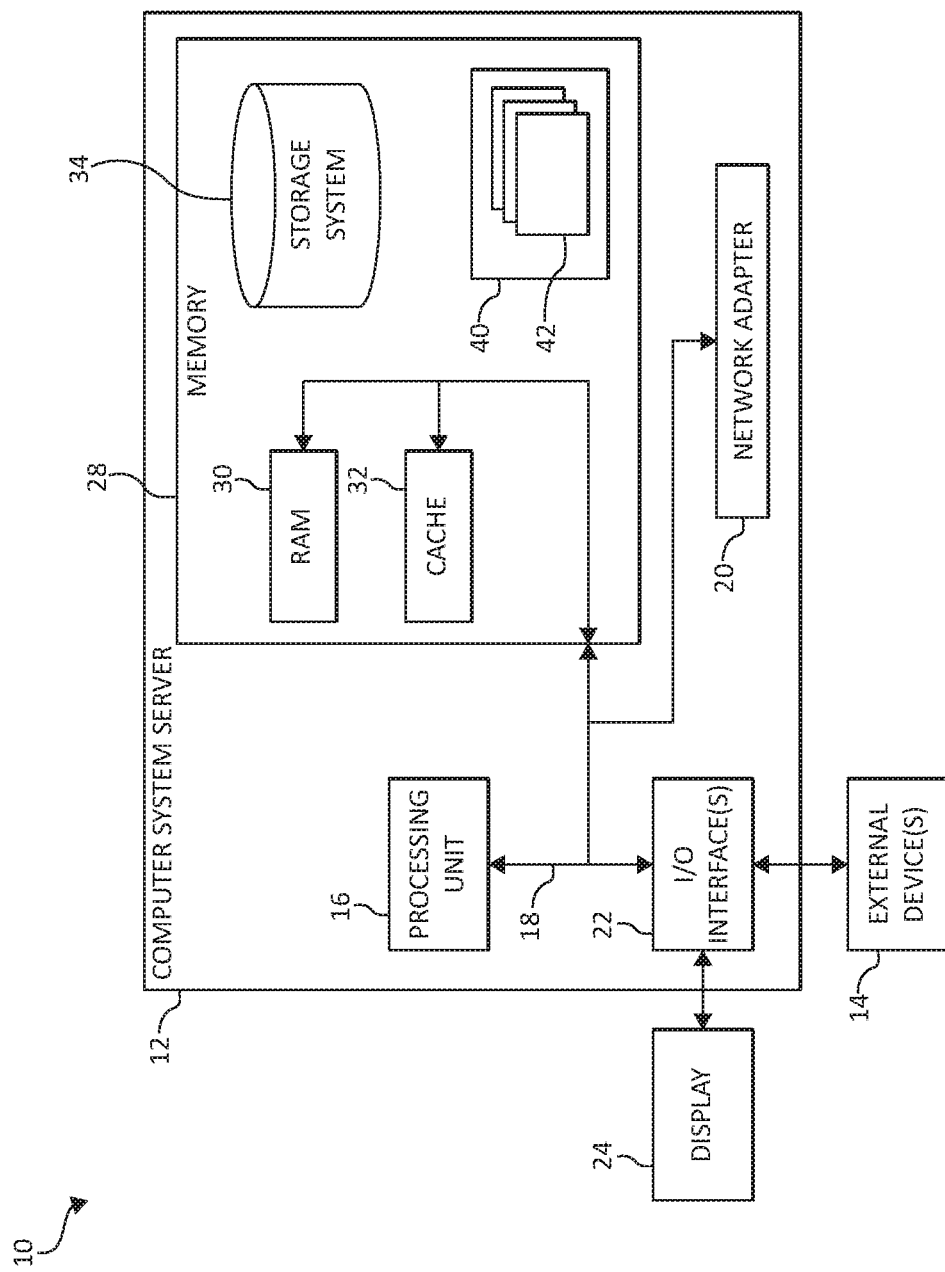
FIG. 1 is a block diagram depicting an exemplary computing node according to an embodiment of the present invention.

As discussed above, generally, distributing computing (or distributed computing systems) refers to computing systems (e.g., cloud systems, "edge" systems, etc.) and/or programs that utilize multiple components (e.g., remote services, nodes, containers, etc.) that are implemented on different networked computing devices that coordinate their actions by sending various types of communications (e.g., requests, data, etc.) to one another. Often, this activity is performed in order to achieve a common goal (i.e., the components are working together to jointly perform a functionality or task). For example, the components (e.g., a core program and remote services, such as microservices) may jointly run a distributed program. The implementation of such systems is becoming increasingly common as many organizations (e.g., companies, service providers, etc.) are transitioning from monolithic applications towards utilizing, for example, multiple microservices and packaged containers.

More specifically, in recent years, the Internet has transformed the formation of applications from monolithic applications (e.g., single code modules composed of multiple libraries to perform various functions) to core programs that utilize web (or web-based) or "remote" services, such as microservices. A properly enabled program written in this internet microservice approach may utilize tens to thousands of evocations of a particular microservice.

In some instances, over time, multiple providers are able to provide the same remote service (e.g., microservice). For example, if a core program requires the current temperature at a particular location, such information may be available through many different online channels (or microservices, providers, etc.). In such cases, the core program (and/or a human responder) may require a method to select the appropriate (and/or the "best") provider. As such, a remote services selection engine (and/or method) may become a fundamental control point of remote services, in the same way search engines have become such for the Internet in general.

To address these needs and/or the shortcomings in the prior art, in some embodiments described herein, methods and/or systems are disclosed that facilitate (and/or provide for) the selection of a remote service (and/or the provider of a remote service). It should be noted that there may be hundreds of selection actions for a single program, each different and each potentially resulting in selection of a different remote service (e.g., microservice) and/or provider. It may be difficult and/or expensive to development software and/or updates thereof in such a way to enhance core programs with the ability to select remote services and/or providers. As such, in some embodiments, the functionality described herein (e.g., scoring, selecting, etc. remote services and/or providers) may be provided by a "remote services selection engine" and/or another node (e.g., a centralized system/server) that is separate from (or external to) the core program (or primary computing system).

It should also be understood that although embodiments described herein may refer to the selection (and/or utilization) of "microservices," the methods and systems described herein may be applied to the selection of other types of remote services or distributed computing components, such as procedure calls, application components, packaged containers, nodes, various types of services, etc. As such, as used herein, "remote service" may refer to any action, service, functionality, etc. (and/or hardware performing such) that is not performed by (and/or is external to) a core program (and/or primary computing system) managed, administered, etc. by a particular user (or consumer). Additionally, remote services may or may not be implemented on/utilizing computing systems different than that of the core program (e.g., a remote computing system in operable communication with a primary computing system via any suitable communications network). Examples may include, but are not limited to, remote services that provide types of information (e.g., weather related information, stock prices, etc.) and perform various types of functionality (e.g., related to accounting, shipping, engineering, software development, data storage, etc.).

In some embodiments, a user or consumer (e.g., an individual, core application, etc.) of a cloud service (e.g., remote service, microservice, application, etc.), which may be provided by a cloud service provider (CSP), identifies one or more selection criteria to a cloud broker (CB) (or other centralized service, server, system, etc.). The CB may gather information associated with one or more remote services (and/or remote service providers) from one or more information sources (IS). The CB may then apply a measurement aggregation method to the collected information and select a remote service (and/or provider) for the user. For example, the CB may calculate a score for each of the available remote services/providers and provide an indication of the remote service (and/or provider) with the highest score to the user and/or automatically cause the remote service with the highest score to be utilized (e.g., by the core program).

In some embodiments, the information (or attribute information) associated with the remote (or external) services and/or providers (e.g., CSPs) utilized to select a remote service and/or calculate scores for remote services (i.e., evaluation criteria) may include any type of information related to the remote service(s) and/or the provider(s) thereof, including technical details of the service and non-technical details related to the service and/or the provider thereof. Examples include, but are not limited to, basic information about and/or attributes of the service (e.g., functional capabilities, technical information, etc.), cost, financial information (e.g., bond rating, cash flow, etc.), social metrics (e.g., rating regarding "green" (or environmentally "friendly") energy, presence/lack of "negative" social associations (e.g., reviews/complaints, social media activity, etc.), information technology (IT) security posture (e.g., number of security breeches in the previous year, IT security evaluation score, etc.), legal information (e.g., litigation activity, arbitration information, etc.), location (e.g., state/locale of incorporation), IT service performance and/or management (e.g., service level agreements (SLAs), mean time to repair (MTTR), support personal per customer, etc.), engagement terms (e.g., length of contract, payment information, etc.), the presence of relationships between providers and the CB, or any other relevant information related to the remote service/provider, including other types of information described herein (which may or may not be related to the user/consumer).

In some embodiments, the aggregation method includes (or utilizes or calculates) a "degree-of-trust" (or trustworthiness) factor (or measure, score, etc.) with respect to each of the information sources. For example, the user may be provided with the ability to weigh the information from a relatively trusted information source higher than that from a less trusted information source. The trustworthiness score for each of the information sources may be retrieved or received (e.g., from another information source, such as a website or database, or may be automatically set by the system) or may be selected/set by the user (e.g., via a setting/configuration functionality or included with a request for a service).

For example, in an embodiment in which higher trustworthiness scores indicate more trustworthy information sources, a respected financial rating agency (e.g., which may provide a bond rating for a provider) may be given a trustworthiness score of 5, while a less respected source (e.g., a tabloid-like website) may be given a trustworthiness score of 1. Similarly, if the information source providing the number of security incidents experienced by a provider is the provider itself, such a source may be given a low trustworthiness score compared to a governmental reporting agency providing the same type of information. Also, in some embodiments, the degree of trust associated with information sources may be established by category. For example, if an information source is related to a government considered to have little corruption, the trustworthiness score may be 10, if the information source is related to a top-rated university, the trustworthiness score may be 9, but if the information source is an entity in a country designated as having significant corruption, then the trustworthiness score may be 2.

In some embodiments, particular evaluation criteria may be selected and weighted. For example, the user may be provided with the ability to select specific evaluation criteria and apply a weighting (or weighting scheme) to the criteria (e.g., via a setting/configuration functionality or included with a request for a service). For example, the user may select the evaluation criteria to include, for example, the provider's bond rating (weighted as 5% of the score), green energy rating (weighted as 15% of the score), number of security breeches (weighted as 50% of the score), and arbitration state (weighted as 30% of the score), perhaps along with a minimum required score for selection.

In such an example, if a provider's bond rating is "AAA," the provider may receive a score of 10 (or 10 points) for that criterion. However, if the bond rating is "BBB," the provider may only receive 5 points, and 0 points if the bond rating is "junk." With respect to green energy, a provider may receive 20 points if 100% of the energy the provider utilizes is considered green, but only 5 points if 50% of the utilized energy is green. With respect to security breeches, if the provider experienced no security breeches (e.g., within the previous year, two years, etc.), the provider may receive 20 points, while 1 breach may result in a score of 0 points, 2 breaches may result in a score of −20 (i.e., a reduction of 20 points), and more than two breaches resulting in a score of −100. With respect to arbitration state, as one example, some states in the United States (or other regions/locales in other countries) may be considered to have more beneficial laws/ rules regarding arbitration, and thus such providers may receive 20 points, while other providers in other states/ locales may only receive 10 points. As mentioned above, in some embodiments, a minimum score may be set/selected such that if none of the providers (or microservices) receives an aggregated score above that threshold, no provider is selected (and/or utilized by the user). However, in some embodiments, such a threshold may be predetermined (e.g., based on the type of service requested).

It should be understood that at least some of the aspects of functionality described herein (e.g., calculating scores for remote services/providers, determining trustworthiness scores for information sources, etc.) may be performed utilizing a cognitive analysis. The cognitive analysis may include natural language processing (NLP) or a NLP technique, such classifying natural language, analyzing tone, and analyzing sentiment (e.g., scanning for keywords, key phrases, etc.) with respect to, for example, content and communications sent to and/or received by users or entities (e.g., providers) and/or other available data sources. In some embodiments, natural language processing (NLP), Mel-frequency cepstral coefficients (MFCCs) (e.g., for audio content), and/or region-based convolutional neural network (R-CNN) pixel mapping (e.g., for object detection/classification in images/videos), as are commonly understood, are used.

The processes described herein may utilize various information or data sources associated with users (e.g., consumers) and/or entities (e.g., remote services, providers, etc.) and/or the content of communications. The data sources may include any available information (or data) sources associated with the user and/or entities. For example, in some embodiments, a profile (e.g., a cognitive profile) for the user(s) (and/or entities) may be generated. Data sources that may be use used to generate cognitive profiles may include any appropriate data sources associated with the user/entity that are accessible by the system (perhaps with the permission or authorization of the user/entity). Examples of such data sources include, but are not limited to, communication sessions and/or the content (or communications) thereof (e.g., phone calls, video calls, text messaging, emails, in person/face-to-face conversations, etc.), a profile of (or basic information about) the user/entity (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases. The cognitive profile(s) may be utilized to, for example, evaluate remote services/providers and/or information sources.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, selecting a remote service (and/or a provider of such), as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that as used herein, the term "computing node" (or simply "node") may refer to a computing device, such as a mobile electronic device, desktop computer, etc. and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for selecting a remote service (e.g., for a core program), by a processor, is provided. A request for a remote service is received (e.g., from a user or core program). Information associated with each of a plurality of remote services is received from at least one information source. A score for each of the plurality of remote services is calculated based on the information associated with each of the plurality of remote services and at least one remote service evaluation criteria.

At least one of the plurality of remote services may be selected based on the calculating of the score for each of the plurality of remote services.

The at least one remote service evaluation criteria may be received. The receiving of the at least one remote service criteria may be performed at least one of before the receiving of the request for the remote service, during the receiving of the request for the remote service, and after the receiving of the request for the remote service.

The receiving of the information associated with each of the plurality of remote services may be performed at least one of before the receiving of the request for the remote service and after the receiving of the request for the remote service.

The at least one information source may include a plurality of information sources. The calculating of the score for each of the plurality of remote services may be based on a trustworthiness measure associated with each of the plurality of information sources.

The receiving of the request for the remote service may include receiving a weighting for each of the at least one remote service evaluation criteria. The calculating of the score for each of the plurality of remote services may be based on the weighting for each of the at least one remote service evaluation criteria. The at least one remote service evaluation criteria may include a minimum score threshold for selecting at least one of the plurality of remote services.

The received information may include information associated with a provider of each of the plurality of remote services. The information associated with the provider of each of the plurality of remote services may include at least one of financial information, security information, legal information, and environmental information.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
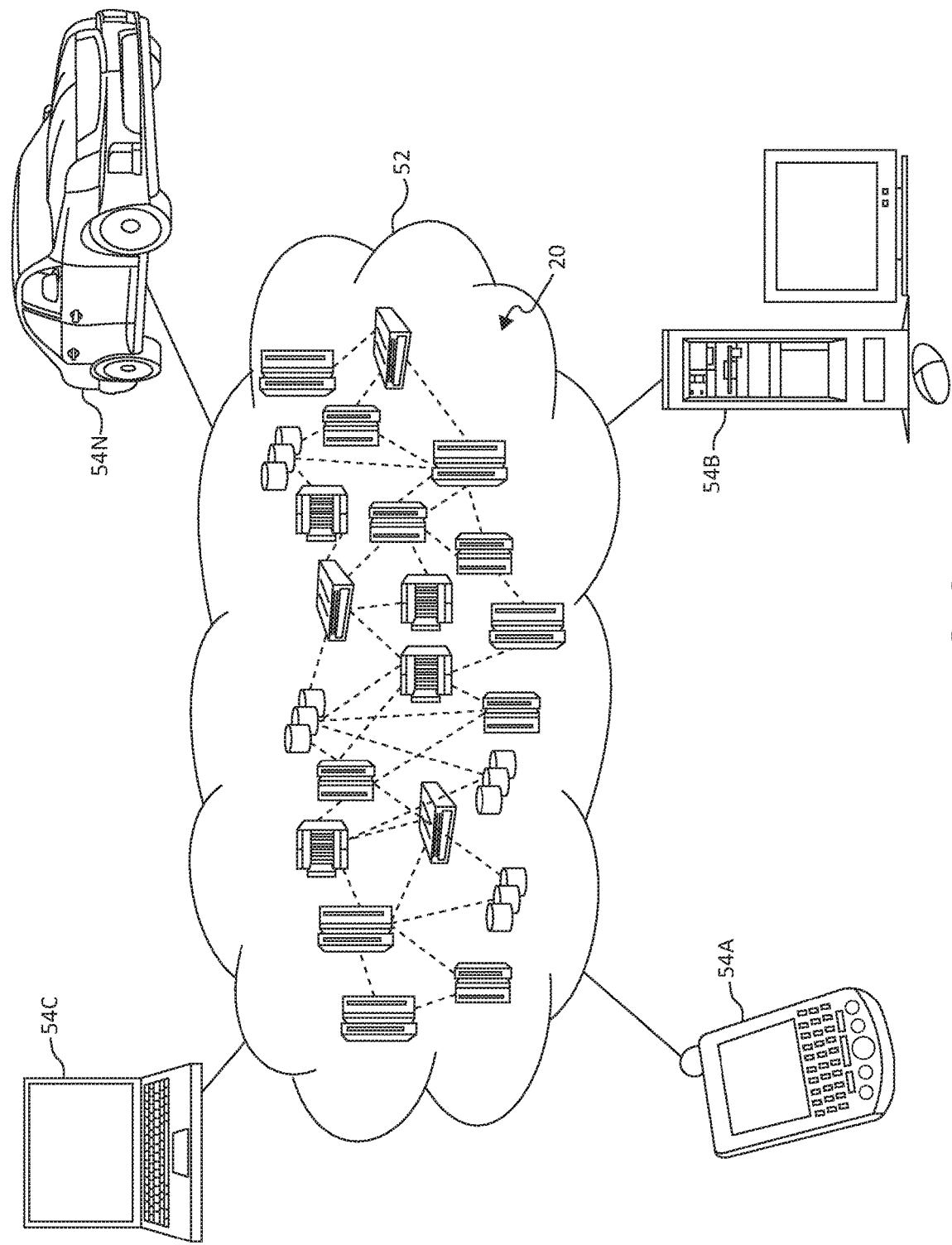
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
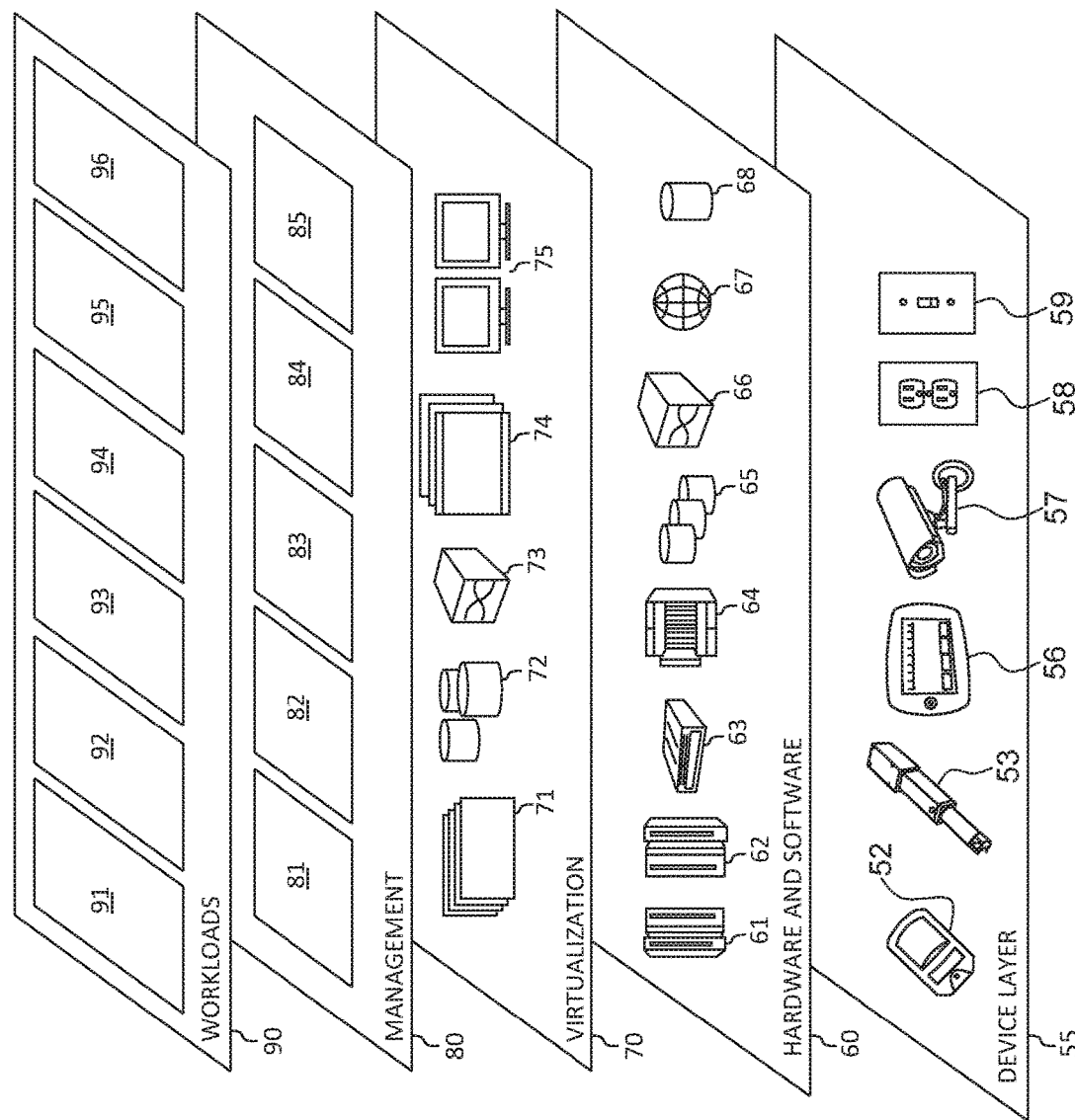
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for selecting a remote service (and/or a provider of such), as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems for selecting a remote service (e.g., a microservice) are provided. For example, in some embodiments, request for a remote service is received (e.g., from a user or core program). Information associated with each of a plurality of remote services is received from one or more one information source. A score for each of the remote services is calculated based on the information associated with the remote services and at least one remote service evaluation criteria. At least one of the remote services may be selected based on the calculating of the score for each of the plurality of remote services.

The remote service evaluation criteria may be received or retrieved (e.g., before, during, and/or after the request for the remote service). The information associated with each of the remote services may be received (or retrieved) before and/or after the request for the remote service is received. The calculating of the scores for the remote services may be based on a trustworthiness measure associated with the information source(s).

The calculating of the scores may be based on a weighting for each of the remote service evaluation criteria, which may be received with the request or predetermined. The remote service evaluation criteria may include a minimum score threshold for selecting at least one of the plurality of remote services. The received information may include information associated with a provider of each of the plurality of remote services. The information associated with the providers may include at least one of financial information, security information, legal information, and environmental information. In other words, in some embodiments, the calculated of the scores is based (at least in part) on information external to (i.e., other than) technical details about the remote services.

Figure 4:
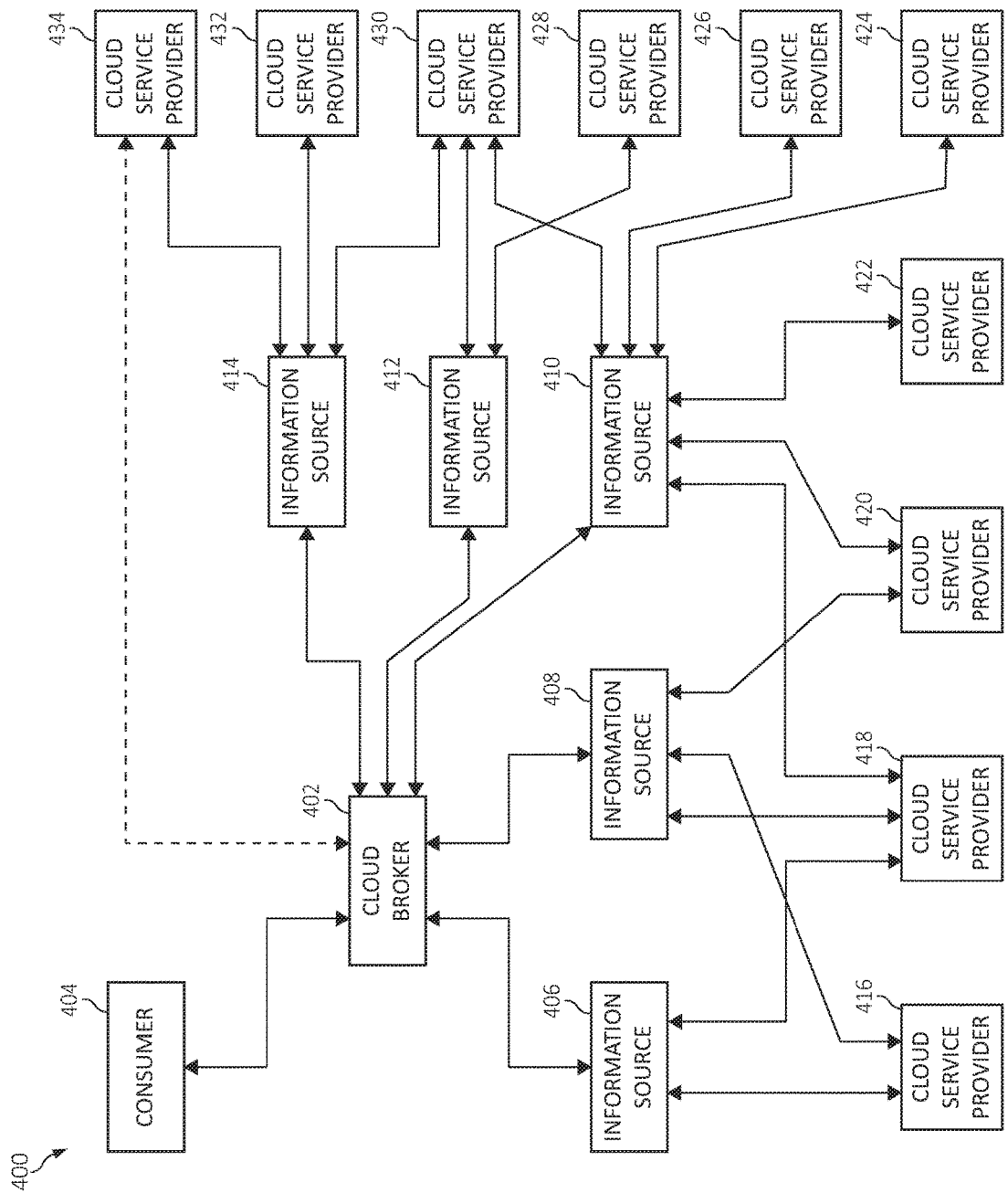
FIG. 4 is a block diagram of an exemplary computing environment according to an embodiment of the present invention.

FIG. 4 illustrates a system (and/or computing environment) 400 in which some of the aspects of functionality described herein may be implemented. As shown, the system 400 includes a cloud broker 402, a consumer 404, information sources 406-414, and cloud service providers 416-434. It should be understood that FIG. 4 is merely intended as an example, and in other embodiments, different numbers of elements, components, entities, etc. (e.g., consumers, cloud brokers, information sources, and/or cloud service providers) may be included. It should also be understood that in some embodiments the various components shown in FIG. 4 may be located remotely from each other and in operable communication via an suitable communications network (e.g., the Internet, the "cloud," etc.).

The cloud broker (or centralized server, service, etc.) 402 may be implemented on any suitable computing system, such as those described above, and may be configured to perform at least some of the functionality described herein (including cognitive analyses). The consumer 404 shown in FIG. 4 may be understood to represent any suitable computing node associated with a user (or consumer), such as a core program or primary computing system. The consumer 404 may be controlled automatically and/or via human intervention.

Still referring to FIG. 4, the information sources 406-414 may include any suitable sources of information or data associated with the cloud services providers 416-434. For example, the information sources 406-414 may include websites, web pages, databases, social media feeds/platforms, etc. which are accessible by the cloud broker 402. Each of the cloud service providers 416-434 may represent a provider of a cloud (or remote, external, etc.) service (e.g., a business, organization, etc. and/or an associated computing system) and/or a service (e.g., remote/external service, such as a microservice) provided by such. As shown, each of the information sources 406-414 is in operable communication with one or more of the cloud service providers 416-434, each of which may be in operable communication with more than one of the information sources 406-414. In other words, each of the information sources 406-414 may receive information from more than one of the cloud services providers 416-434, and each of the cloud service providers 416-434 may provide information to more than one of the information sources 406-414.

It should be noted that although the information sources 406-414 and cloud service providers 416-434 are shown as separate components (or entities) in FIG. 4, in some embodiments, at least some of the information sources 406-414 may be (directly) associated with one or more of the cloud service providers (e.g., a website of a cloud service provider). In other words, in some embodiments, at least some of the cloud service providers may essentially be (or function as) information sources and/or otherwise provide information related to the respective service(s)/provider(s) directly to the cloud broker. An example of such is shown in FIG. 4 by the dashed line formed directly between the cloud broker 402 and cloud service provider 434.

In some embodiments, the consumer 404 provides a request to the cloud broker 402 for a selection (or recommendation) of a cloud service provider (and/or a service provided by such). The request may include one or more evaluation criteria selected by the consumer 404 as being relevant or important (including the type of service requested), or the criteria may be provided by the consumer 404 in a subsequent communication. However, in some embodiments, the evaluation criteria may be predefined (e.g., based on the type of service requested, previously selected by the consumer, etc). In some embodiments, the cloud broker 402 retrieves (or receives) information associated with the cloud services providers 416-434 (e.g., associated with/related to the evaluation criteria of the consumer 404) from the information sources 406-414.

However, in some embodiments, the cloud broker 402 may retrieve information from the information sources 406-414 (and/or the cloud service providers 416-434) before a request is received from a user (or consumer). For example, the cloud broker 402 may intermittently receive or retrieve information associated with cloud service providers 416-434 (e.g., from the information sources 406-414 and/or the cloud service providers 416-434), store the information (or keep the information "cached"), and then utilize the information when, for example, a request is received from a consumer, as described below.

In some embodiments, the information associated with the cloud service providers 416-434 (and/or the service(s) provided thereby) that is received from the information sources 406-414 (and/or the evaluation criteria) may include, but is not limited to, basic information about and/or attributes of the service (e.g., functional capabilities), cost, financial information (e.g., bond rating, cash flow, etc.), social metrics (e.g., rating regarding "green" (or environmentally "friendly") energy, presence/lack of "negative" social associations, reviews/complaints, social media activity), information technology (IT) security posture (e.g., number of security breeches in the previous year, IT security evaluation score, etc.), legal information (e.g., litigation activity, arbitration information, etc.), location, IT service performance and/or management (e.g., service level agreements (SLAs), mean time to repair (MTTR), support personal per customer, etc.), engagement terms (e.g., length of contract, payment information, etc.), the presence of relationships between providers and the CB, or any other relevant information, including other types of information described herein. It should be noted that at least some of the information/criteria may be related to types of information besides technical details about the services and/or providers (e.g., financial information, legal information, etc.).

The cloud broker 402 may then evaluate each of the cloud service providers (and/or the service(s) provided thereby). In some embodiments, the cloud broker 402 first generates (or creates) a list of the cloud service providers 416-434 that are generally capable of performing the functionality requested by the consumer. The cloud broker 402 may then calculate a score (or aggregated score) for each of the cloud service providers 416-434 on the list utilizing the evaluation criteria (e.g., provided by the consumer 404). As described above, in some embodiments, the calculating of the scores is also based on a trustworthiness measure (or factor, score, etc.) associated with the information source 406-414 from which each respective type of information is received. The trustworthiness measure associated with each of the information sources 406-414 may be, for example, defined by the consumer (e.g., and included in the request), predetermined (e.g., based on the type of service requested), and/or retrieved from another information source (e.g., one or more database, website, etc.).

The scores may be calculated as numeric scores (e.g., scalars or vectors, positive or negative, on any scale, etc.) or may be in the form of "grades" (e.g., "high," "low," etc.). In some embodiments, the evaluation of the cloud service providers 416-434 is performed utilizing a cognitive analysis.

The cloud broker 402 may then select the cloud service provider 416-434 with the highest score (or in some embodiments, the lowest score) as the cloud service provider 416-434 that is "best" or "preferred" for the consumer 404. In some embodiments, the evaluation criteria may include a minimum threshold. In such instances, a cloud service provider 416-434 may only be selected (or recommended) if one or more of the cloud service providers 416-434 receives a score above the threshold. After a cloud service provider 416-434 is selected, a signal representative thereof may be generated and provided to the consumer. For example, a notification of the selected cloud service provider 416-434 may be generated and sent to the consumer (e.g., via email, pop-up window, or any other suitable electronic communication). In some embodiments, the selected cloud service provider 416-434 is caused to be automatically utilized by the consumer 404 (e.g., utilized by a core program administrated by the consumer 404).

Figure 5:
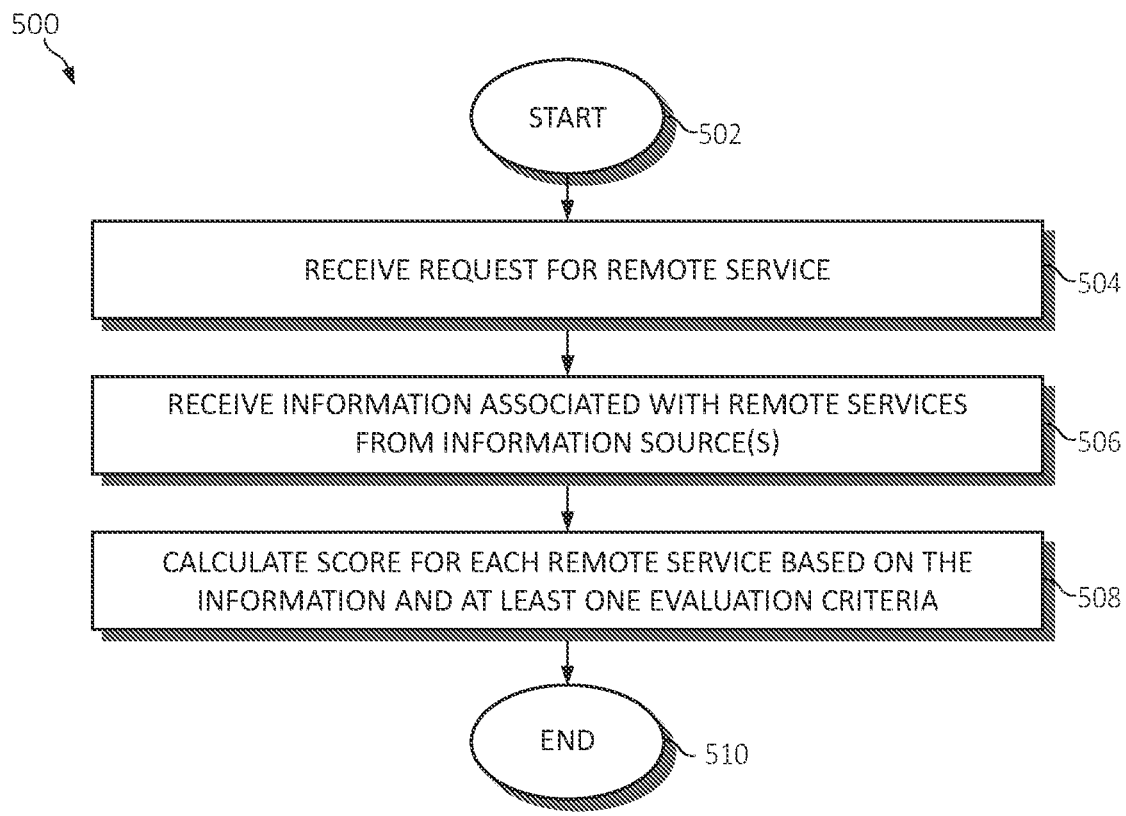
FIG. 5 is a flowchart diagram of an exemplary method for selecting a remote service according to an embodiment of the present invention.

Turning to FIG. 5, a flowchart diagram of an exemplary method 500 for selecting a remote (e.g., web-based, external to a core program, etc.) service (e.g., a microservice or other distributed computing component/service) is provided. The method 500 begins (step 502) with, for example, a plurality of remote services being made available and a user (or consumer) deciding to utilize one of the remote services (and/or determining a need for such a service).

A request for a remote service is received (or retrieved, detected, etc.) (step 504). For example, the user or core program may provide a request for a selection or recommendation of a remote service and/or remote service provider. In some embodiments, at least one remote service evaluation criteria (or criterion) is received and/or included with the request. However, in some embodiments, the criteria may be previously determined or selected (e.g., based on the type of service requested) and/or provided in a subsequent communication. The at least one remote service evaluation criteria may include a weighting for each of the at least one remote service evaluation criteria. The at least one remote service evaluation criteria may include a minimum score threshold for selecting at least one of the plurality of remote services.

Information associated with each of a plurality of remote services is received from at least one information source (step 506). The at least one information source may include a plurality of information sources. The information source(s) may include, for example, websites, web pages, databases, social media feeds, etc. (which may or may not be directly associated with the remote services/providers). The received information may include information associated with a provider of each of the plurality of remote services. The information associated with the provider of each of the plurality of remote services may include at least one of financial information, security information, legal information, and environmental information. The receiving of the information associated with each of the plurality of remote services may be performed before and/or after the receiving of the request for the remote service.

A score is calculated for each of the plurality of remote services based on the information associated with each of the plurality of remote services and (the) at least one remote service evaluation criteria (step 508). The calculating of the score for each of the plurality of remote services may be (further) based on a trustworthiness measure associated with each of the plurality of information sources and/or the weighting for each of the at least one remote service evaluation criteria, as described above.

Method 500 ends (step 510) with, for example, at least one of the plurality of remote services being selected based on the calculated scores. A signal representative of the selection may be generated and provided to the user (e.g., via an electronic communication). In some embodiments, feedback from users may also be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for selecting a remote service for a core program, by a processor, comprising:
   receiving a request for a remote service;
   receiving information associated with each of a plurality of remote services from a plurality of information sources notwithstanding whether the plurality of information sources are affiliated with any of the plurality of remote services, wherein a first portion of the received information includes technical information associated with at least some of the plurality of remote services and a second portion of the received information includes non-technical information associated with the at least some of the plurality of remote services; and
   calculating a score for each of the plurality of remote services based on the information associated with each of the plurality of remote services and at least one remote service evaluation criteria, wherein the calculating of the score for each of the plurality of remote services is based on a respective trustworthiness measure assigned to each of the plurality of information sources.

2. The method of claim 1, further comprising selecting at least one of the plurality of remote services based on the calculating of the score for each of the plurality of remote services.

3. The method of claim 1, further comprising receiving the at least one remote service evaluation criteria, wherein the receiving of the at least one remote service evaluation criteria is performed at least one of before the receiving of the request for the remote service, during the receiving of the request for the remote service, and after the receiving of the request for the remote service.

4. The method of claim 1, wherein the receiving of the information associated with each of the plurality of remote services is performed at least one of before the receiving of the request for the remote service and after the receiving of the request for the remote service.

5. The method of claim 1, wherein the receiving of the request for the remote service includes receiving a weighting for each of the at least one remote service evaluation criteria, and wherein the calculating of the score for each of the plurality of remote services is based on the weighting for each of the at least one remote service evaluation criteria.

6. The method of claim 1, wherein the received information includes information associated with a provider of each of the plurality of remote services, and wherein the information associated with the provider of each of the plurality of remote services includes at least one of financial information, security information, legal information, and environmental information.

7. A system for selecting a remote service for a core program comprising:
   a processor executing instructions stored in a memory device, wherein the processor:
   receives a request for a remote service;
   receives information associated with each of a plurality of remote services from a plurality of information sources notwithstanding whether the plurality of information sources are affiliated with any of the plurality of remote services, wherein a first portion of the received information includes technical information associated with at least some of the plurality of remote services and a second portion of the received information includes non-technical information associated with the at least some of the plurality of remote services; and
   calculates a score for each of the plurality of remote services based on the information associated with each of the plurality of remote services and at least one remote service evaluation criteria, wherein the calculating of the score for each of the plurality of remote services is based on a respective trustworthiness measure assigned to each of the plurality of information sources.

8. The system of claim 7, wherein the processor further selects at least one of the plurality of remote services based on the calculating of the score for each of the plurality of remote services.

9. The system of claim 7, wherein the processor further receives the at least one remote service evaluation criteria, wherein the receiving of the at least one remote service evaluation criteria is performed at least one of before the receiving of the request for the remote service, during the receiving of the request for the remote service, and after the receiving of the request for the remote service.

10. The system of claim 7, wherein the receiving of the information associated with each of the plurality of remote services is performed at least one of before the receiving of the request for the remote service and after the receiving of the request for the remote service.

11. The system of claim 7, wherein the receiving of the request for the remote service includes receiving a weighting for each of the at least one remote service evaluation criteria, and wherein the calculating of the score for each of the plurality of remote services is based on the weighting for each of the at least one remote service evaluation criteria.

12. The system of claim 7, wherein the received information includes information associated with a provider of each of the plurality of remote services, and wherein the information associated with the provider of each of the plurality of remote services includes at least one of financial information, security information, legal information, and environmental information.

13. A computer program product for selecting a remote service for a core program, by a processor, the computer program product embodied on a non-transitory computer-readable storage medium having computer-readable program code portions stored therein, the computer-readable program code portions comprising:

an executable portion that receives a request for a remote service;

an executable portion that receives information associated with each of a plurality of remote services from a plurality of information sources notwithstanding whether the plurality of information sources are affiliated with any of the plurality of remote services, wherein a first portion of the received information includes technical information associated with at least some of the plurality of remote services and a second portion of the received information includes non-technical information associated with the at least some of the plurality of remote services; and an executable portion that calculates a score for each of the plurality of remote services based on the information associated with each of the plurality of remote services and at least one remote service evaluation criteria, wherein the calculating of the score for each of the plurality of remote services is based on a respective trustworthiness measure assigned to each of the plurality of information sources.

14. The computer program product of claim 13, wherein the computer-readable program code portions further include an executable portion that selects at least one of the plurality of remote services based on the calculating of the score for each of the plurality of remote services.

15. The computer program product of claim 13, wherein the computer-readable program code portions further include an executable portion that receives the at least one remote service evaluation criteria, wherein the receiving of the at least one remote service evaluation criteria is performed at least one of before the receiving of the request for the remote service, during the receiving of the request for the remote service, and after the receiving of the request for the remote service.

16. The computer program product of claim 13, wherein the receiving of the information associated with each of the plurality of remote services is performed at least one of before the receiving of the request for the remote service and after the receiving of the request for the remote service.

17. The computer program product of claim 13, wherein the receiving of the request for the remote service includes receiving a weighting for each of the at least one remote service evaluation criteria, and wherein the calculating of the score for each of the plurality of remote services is based on the weighting for each of the at least one remote service evaluation criteria.

18. The computer program product of claim 13, wherein the received information includes information associated with a provider of each of the plurality of remote services, and wherein the information associated with the provider of each of the plurality of remote services includes at least one of financial information, security information, legal information, and environmental information.

* * * * *